(12) United States Patent
Nichols et al.

(10) Patent No.: US 11,662,177 B2
(45) Date of Patent: May 30, 2023

(54) TARGET DOT SIGHT HAVING TARGET ILLUMINATION SENSOR

(71) Applicant: Sig Sauer, Inc., Newington, NH (US)

(72) Inventors: John P. Nichols, Tigard, OR (US); David Pierson, Tualatin, OR (US)

(73) Assignee: SIG SAUER, INC., Newington, NH (US)

( * ) Notice: Subject to any disclaimer, the term of this patent is extended or adjusted under 35 U.S.C. 154(b) by 0 days.

(21) Appl. No.: 17/857,944

(22) Filed: Jul. 5, 2022

(65) Prior Publication Data

US 2023/0003484 A1    Jan. 5, 2023

Related U.S. Application Data

(63) Continuation of application No. 17/152,745, filed on Jan. 19, 2021, now Pat. No. 11,378,357.

(60) Provisional application No. 62/962,696, filed on Jan. 17, 2020.

(51) Int. Cl.
*F41G 1/35* (2006.01)
*F21V 8/00* (2006.01)

(52) U.S. Cl.
CPC .............. *F41G 1/35* (2013.01); *G02B 6/0005* (2013.01)

(58) Field of Classification Search
CPC .............................. F41G 1/356; G02B 6/0005
See application file for complete search history.

(56) References Cited

U.S. PATENT DOCUMENTS

| | | |
|---|---|---|
| 2003/0029072 A1 | 2/2003 | Danielson et al. |
| 2018/0372448 A1 | 12/2018 | Noskowicz |
| 2020/0103203 A1 | 4/2020 | Seznec-Serpaggi |
| 2021/0164759 A1 | 6/2021 | Genna et al. |

FOREIGN PATENT DOCUMENTS

CN         109405645 A       3/2019

OTHER PUBLICATIONS

International Search Report and Written Opinion of the International Searching Authority issued in International Application No. PCT/US2021/014021, dated Apr. 30, 2021, 12 pages.

*Primary Examiner* — Thomas M Sember
(74) *Attorney, Agent, or Firm* — Miller Nash LLP

(57) ABSTRACT

A target dot sight includes a target illumination sensor that senses the amount of illumination at a target, rather than merely sensing the ambient sight of the entire operating environment. Then, based on the sensed target illumination, the target dot sight may automatically compensate for the brightness of the target.

18 Claims, 7 Drawing Sheets

TARGET DOT SIGHT HAVING TARGET ILLUMINATION SENSOR

CROSS-REFERENCE TO RELATED APPLICATIONS

This application is continuation of U.S. non-provisional patent application Ser. No. 17/152,745, titled "TARGET DOT SIGHT HAVING TARGET ILLUMINATOR SENSOR," filed Jan. 19, 2021, which is a non-provisional of and claims benefit from U.S. provisional patent application No. 62/962,696, titled "TARGETING DOT SIGHT HAVING TARGET ILLUMINATION SENSOR," filed Jan. 17, 2020, the disclosures of both of which are incorporated herein by reference in their entirety.

FIELD

This disclosure relates to a target dot sight for a firearm, and, more particularly, to a system for controlling the brightness of the target dot sight.

BACKGROUND

A target dot sights project a target dot, such as a red dot, at a target. Early red dot sights included a single, static, brightness setting. Since the ambient light of the environment in which the shooter is operating may vary, manufacturers began offering user-controlled brightness settings. This allowed the user to manually increase the brightness of the target dot in bright conditions, and to reduce the brightness in dark conditions. Next came automatic brightness adjusters, where, based off readings from an ambient light sensor on the sight, the target dot would automatically increase brightness when the ambient light is brighter, and reduce the brightness of the target dot when there is less ambient light. A problem, exists in these automatic adjustment systems, however, in that the target itself may have a different brightness level than the ambient light gathered by the light sensor. For instance, the target may be brightly lit at the far end of a dark room. In such a condition, the ambient sensor correctly senses that the room is dark, and therefore reduces the target dot brightness accordingly. In this example, the target dot may not even be visible at the bright target because the ambient sensor caused the sight to reduce the brightness of the target dot.

Embodiments of the disclosure address these and other limitations of the art.

DETAILED DESCRIPTION

In embodiments, a target dot sight includes a target illumination sensor that senses the amount of illumination at a target, rather than merely sensing the ambient sight of the entire operating environment. Then, based on the sensed target illumination, the target dot sight automatically compensates for the brightness of the target. Further, in some embodiments, the brightness of the target dot generated by the sight is not just a function of the input of the sensor, but rather includes logic to control the brightness in an intelligent way.

Figure 1:
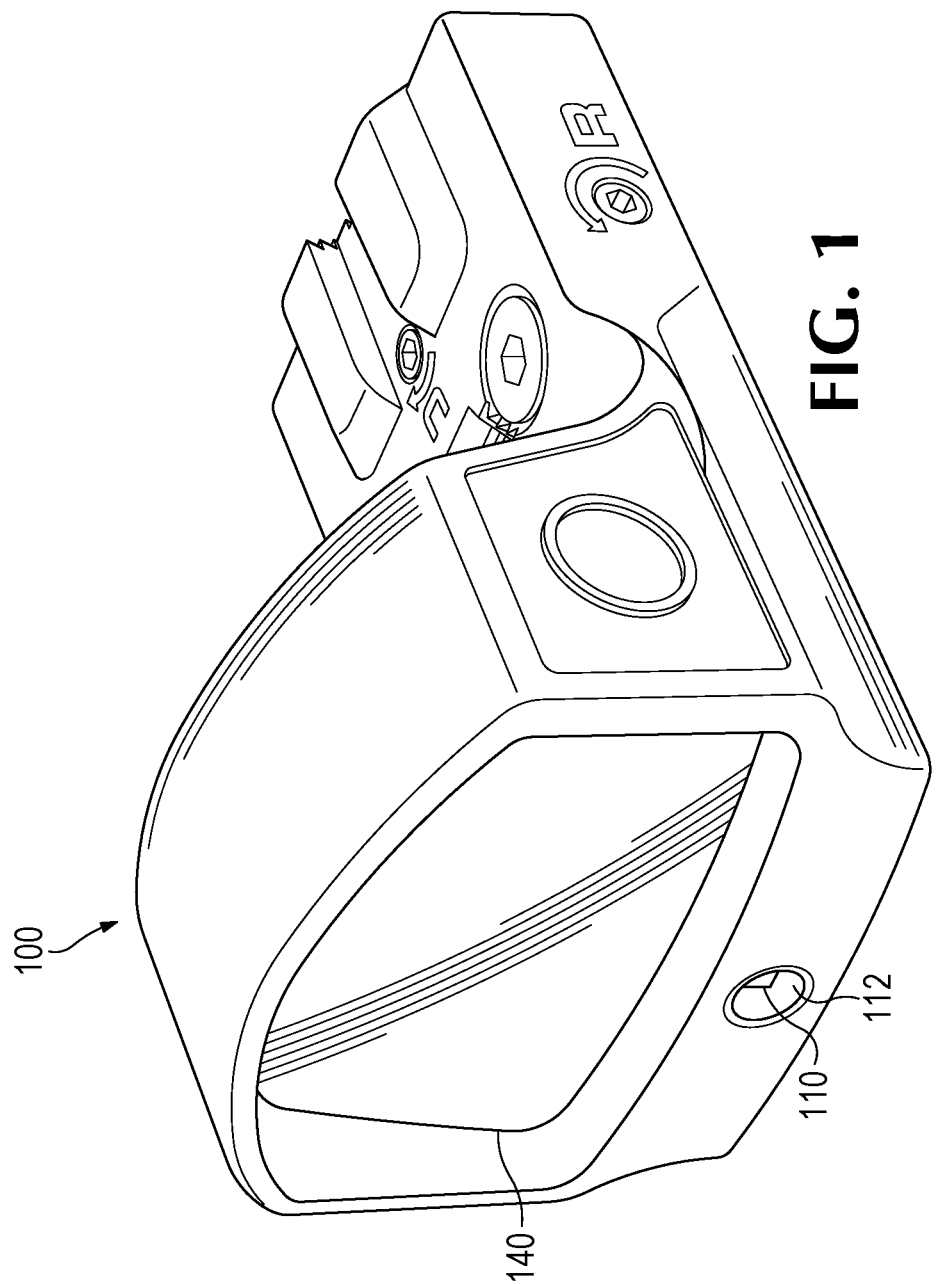
FIG. 1 is a perspective view of a target dot sight having a target illumination sensor and automatic brightness control according to embodiments of the invention.

FIG. 1 is a perspective view of a target dot sight 100 having a target illumination sensor 110 and automatic brightness control according to embodiments of the invention.

Figure 2:
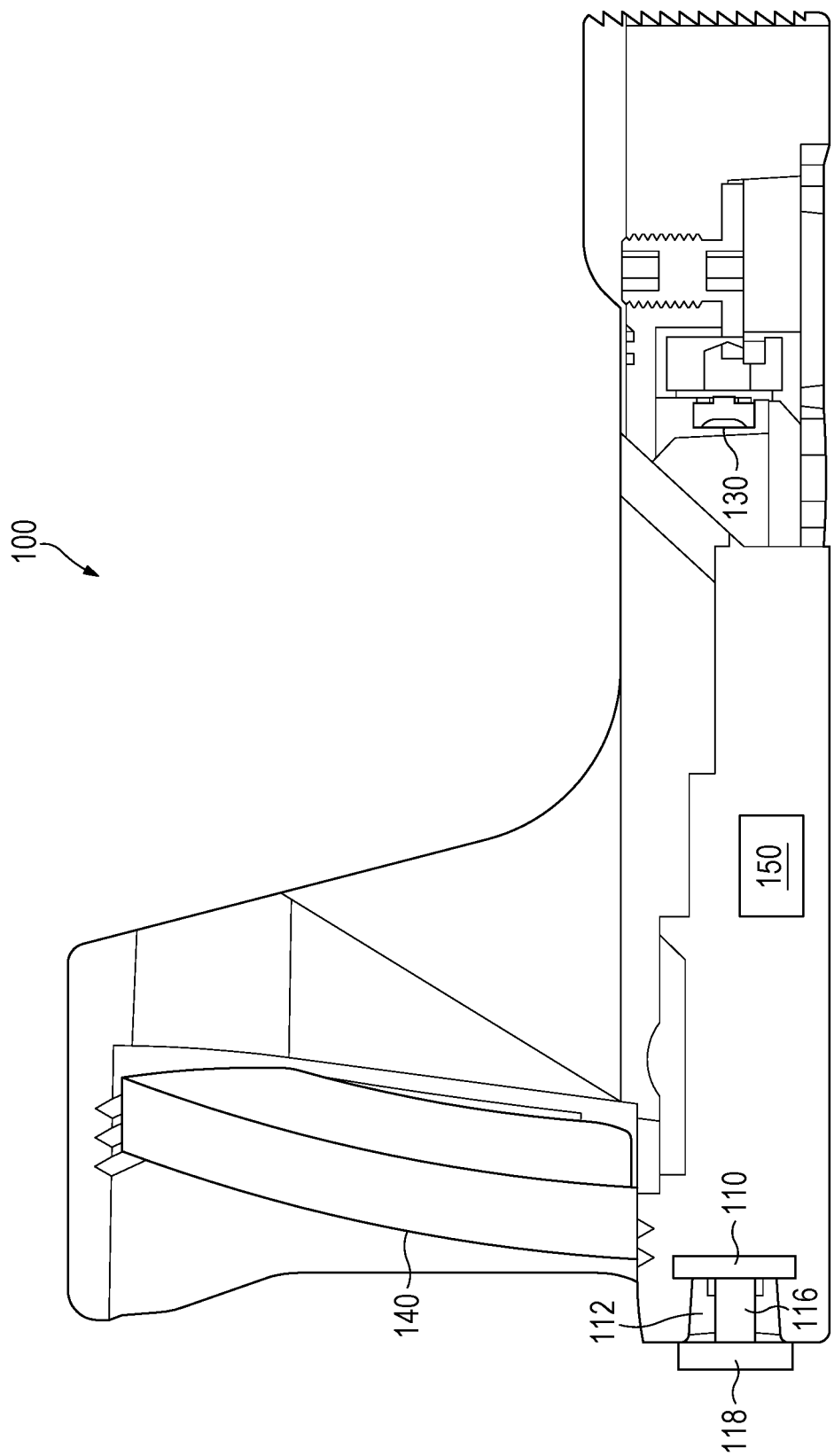
FIG. 2 is a side view of the target dot sight illustrated in FIG. 1 according to embodiments.

FIG. 2 is a side view of the target dot sight 100 illustrated in FIG. 1 according to embodiments. This view shows that the sensor 110 sits within a recess 112, rather than being mounted at the front of the housing of the sight 100, such as an ambient light sensor would be. The recess 112 blocks ambient light from entering the sensor 110, and instead the sensor 110 senses light from the target itself. The shape and depth of the recess 112 may be implementation specific. In other words, for some embodiments, a deeper recess 112 provides better overall operation of the automatic brightness control of the sight 100. In other embodiments, a shallower recess 112 may be used. In some embodiments the recess 112 may extend between 2 and 10 mm from the front surface of the sight 100, with the sensor 110 mounted at the rear-most end of the recess, as illustrated in FIG. 2. In preferred embodiments the recess 112 may be 5-6 mm in length. In some embodiments the recess 112 is not a recess at all, but instead may be a protrusion from the sight 200 that functions to block ambient light from the sensor 110.

In some embodiments a light pipe or fiber optic 116 may be mounted in the recess 112 to convey light from the target to the sensor 110. The light pipe or fiber optic 116 carries light from a front end of the pipe to the sensor 110, so that the sensor 110 may sense the light at the target, without having ambient light interfere with the sensor measurement.

In yet other embodiments a lens 118 may be mounted at or near the front opening of the recess 112. In those embodiments, the lens 118 operates to focus the light from the target to the sensor 110 to minimize intrusion of ambient light. In some embodiments the lens 118 may be a Fresnel lens or have the same or similar function as a Fresnel lens to further block ambient light. Some embodiments include both a lens 118 as well as the light pipe (or fiber optic) 116 in the recess 112.

FIG. 2 also illustrates a light generating device 130, such as an LED. When the LED 130 is ON, it generates light that shines through a lens 140 toward the target. A brightness control circuit 150 drives the LED 130 to generate different amounts of light, depending on the operating conditions, as described in detail below.

Figure 3:
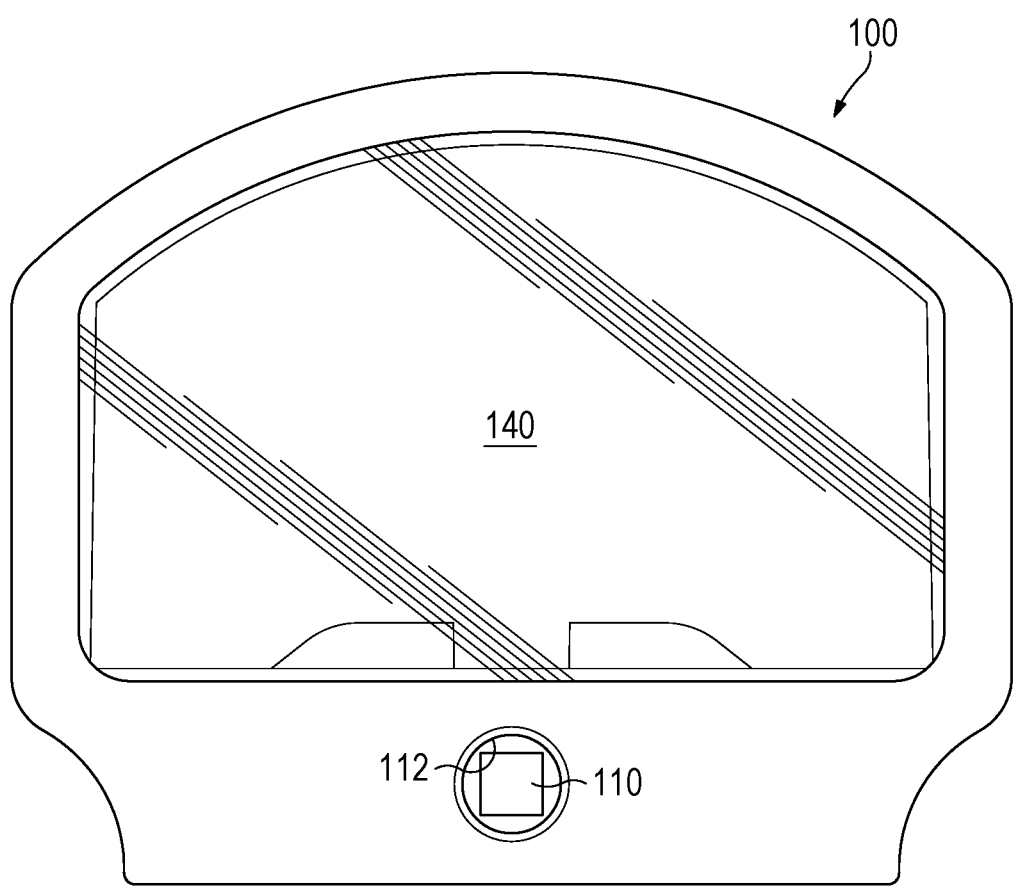
FIG. 3 is a front view of the target dot sight illustrated in FIG. 1 according to embodiments.

FIG. 3 is a front view of the target dot sight illustrated in FIG. 1 according to embodiments, which shows the sensor 110 within the recess 112 in the body of the sight 100, as well as the lens 140 that focuses the light signal from the light generating device 130 on the target.

Figure 4:
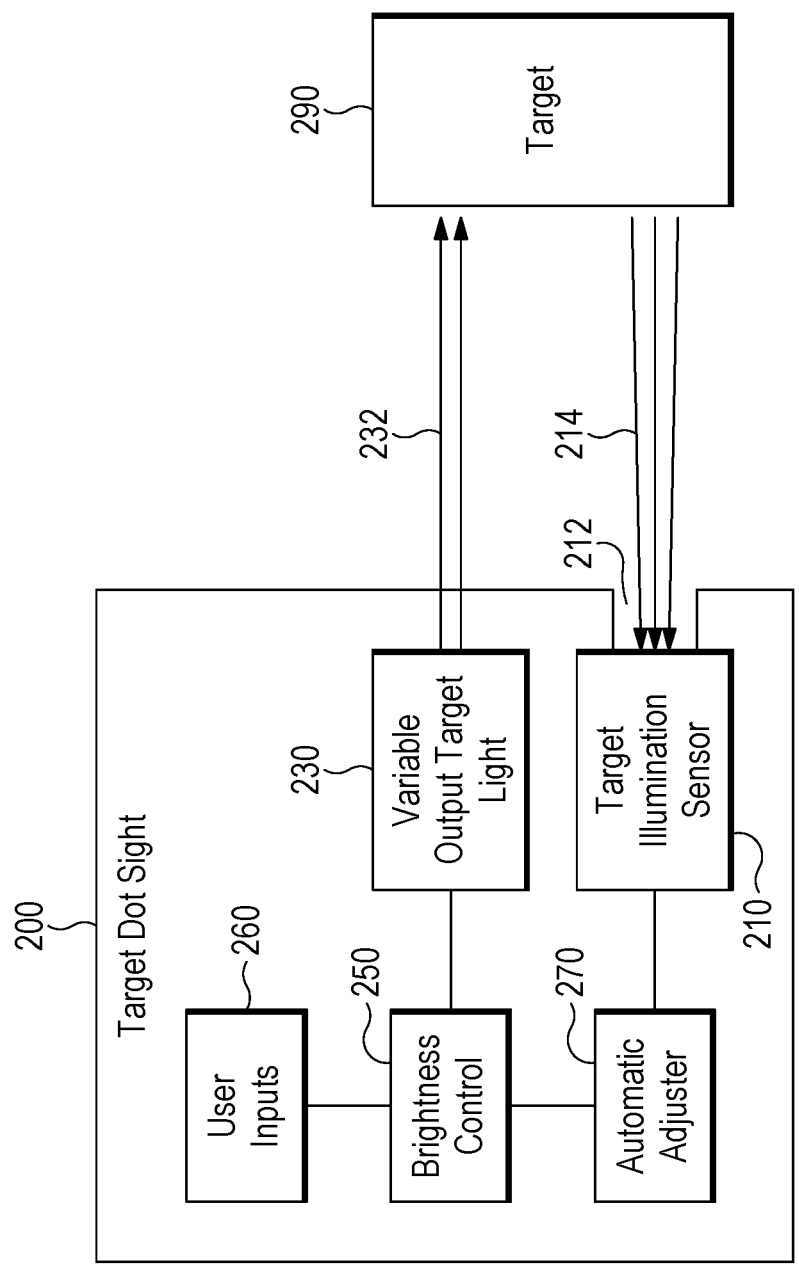
FIG. 4 is a functional block diagram illustrating example operations of a brightness control of the target dot sight of FIG. 1, according to embodiments.

FIG. 4 is a functional block diagram illustrating example components and operations of a brightness control of a target dot sight 200, which may be an example of the sight 100 described above, according to embodiments. In FIG. 4, a variable output target light 230 may have the same function as the light generating device 130 of FIG. 2. For example, the target light 230 may generate a light signal 232, such as a red dot, and projects the red dot onto a target 290. In other embodiments the target light 230 may generate another color dot, or may generate a pattern, such as a target pattern. A target illumination sensor 210 may have the same function as the sensor 110 of FIG. 2, which is to sense the illumination, or brightness level, or the lux, of the target 290. As described above, the target illumination sensor 210 sits in a recess 212 sized and shaped so that the light from the target 290 is sensed more than the ambient light that is near the sight 200.

In some embodiments, the target light 230 has multiple brightness settings, and the brightness of the light generated by the target light 230 is controlled by a brightness control 250. The brightness control 250 may be controlled by user inputs 260, or by an automatic adjuster 270, or may be controlled by a combination of both of these at different times of operation. When the brightness control 250 is controlled by the user inputs 260, the brightness control 250 causes the target light 230 to shine more brightly when the user increases the brightness level, and to shine less brightly when the user decreases the brightness level. Typically the user inputs 260 are a manual process, such as a pair of up/down buttons, or a single button that cycles through a number of predetermined power settings before repeating the brightness levels. In other embodiments the user inputs 260 may include a menu and menu selector. In an automatic mode, when the brightness control 250 is controlled by the automatic adjuster 270, the user-set brightness level is not enabled and the brightness of the target light 230 is automatically set at a level determined by the automatic adjuster 270. In some embodiments the sight 200 will alternate between the brightness control 250 being controlled by user inputs 260, or by the automatic adjuster 270, according operations as described below. In other embodiments the automatic adjustor 270 may store the present user setting and revert to the stored setting under certain conditions.

Figure 5:
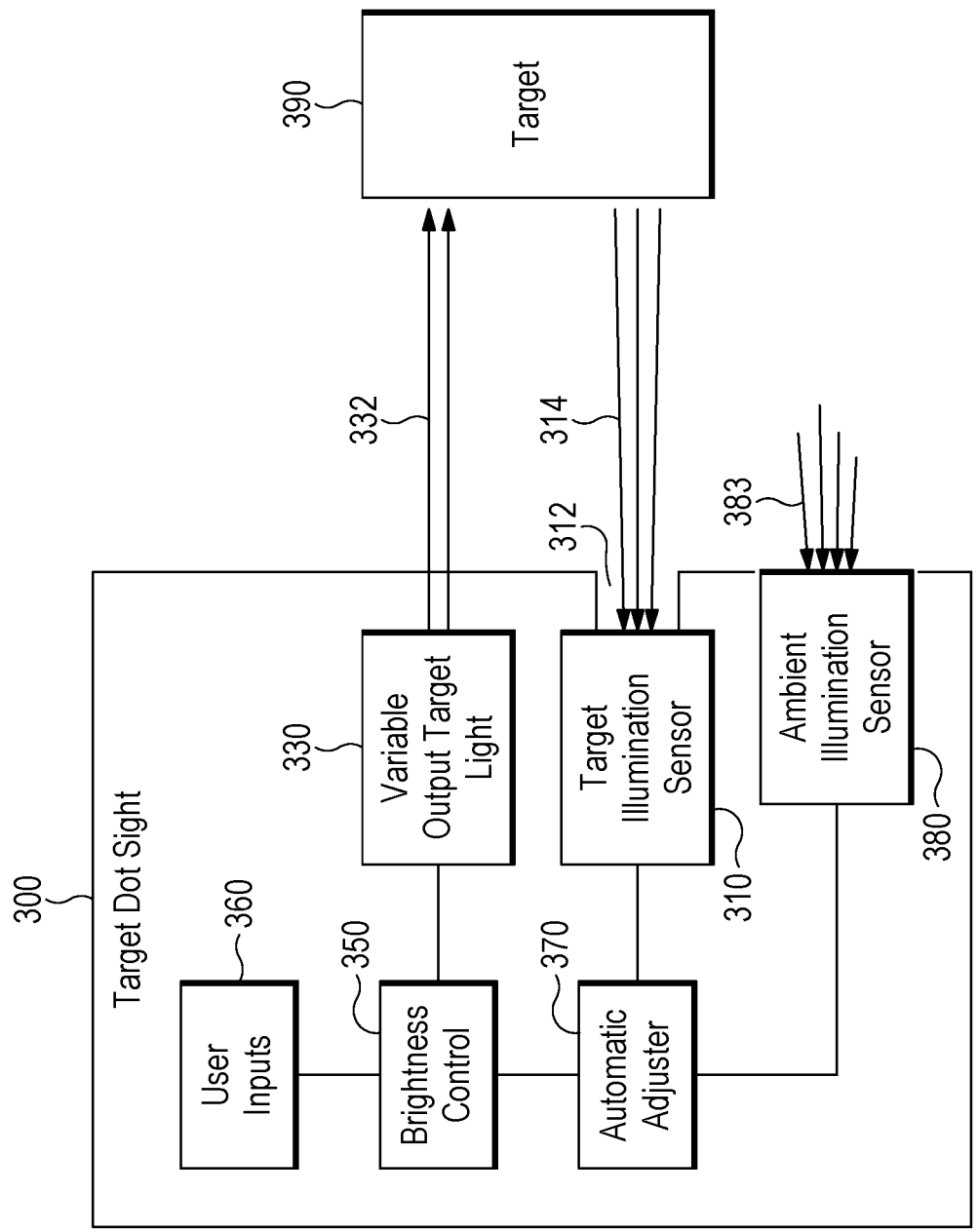
FIG. 5 is a functional block diagram illustrating example operations of a brightness control of another target dot sight according to embodiments.

FIG. 5 is a functional block diagram illustrating example components and operations of another brightness control of a target dot sight 300, which may be an example of the sight 100 described above, according to embodiments. The target dot sight 300 differs from the target dot sight 200 in that the target dot sight 300 further includes, in addition to the components of the target sight 200, an ambient illumination sensor 380. Differently than the target illumination sensor 310, the ambient illumination sensor 380 sits at or near the front edge of the sight 300. In this way the ambient illumination sensor 380 may sense light more near the target dot sight 300 itself than does the target illumination sensor, 310, which instead senses light from the target 390.

A user may use the user inputs 360 to control which illumination sensor is operative on the target dot sight 300. In other words, the user may select to use the target illumination sensor 310 or the ambient illumination sensor 380. In other embodiments the user may select to use a combination of both of the sensors 310 and 380. In yet other embodiments the user may set the sensors 310, 380 to a desired relative weighting level. For instance, the user may set the target dot sight 300 to weight the target illumination sensor at 310 at 35% and the ambient illumination sensor 380 at 65%.

Figure 6:
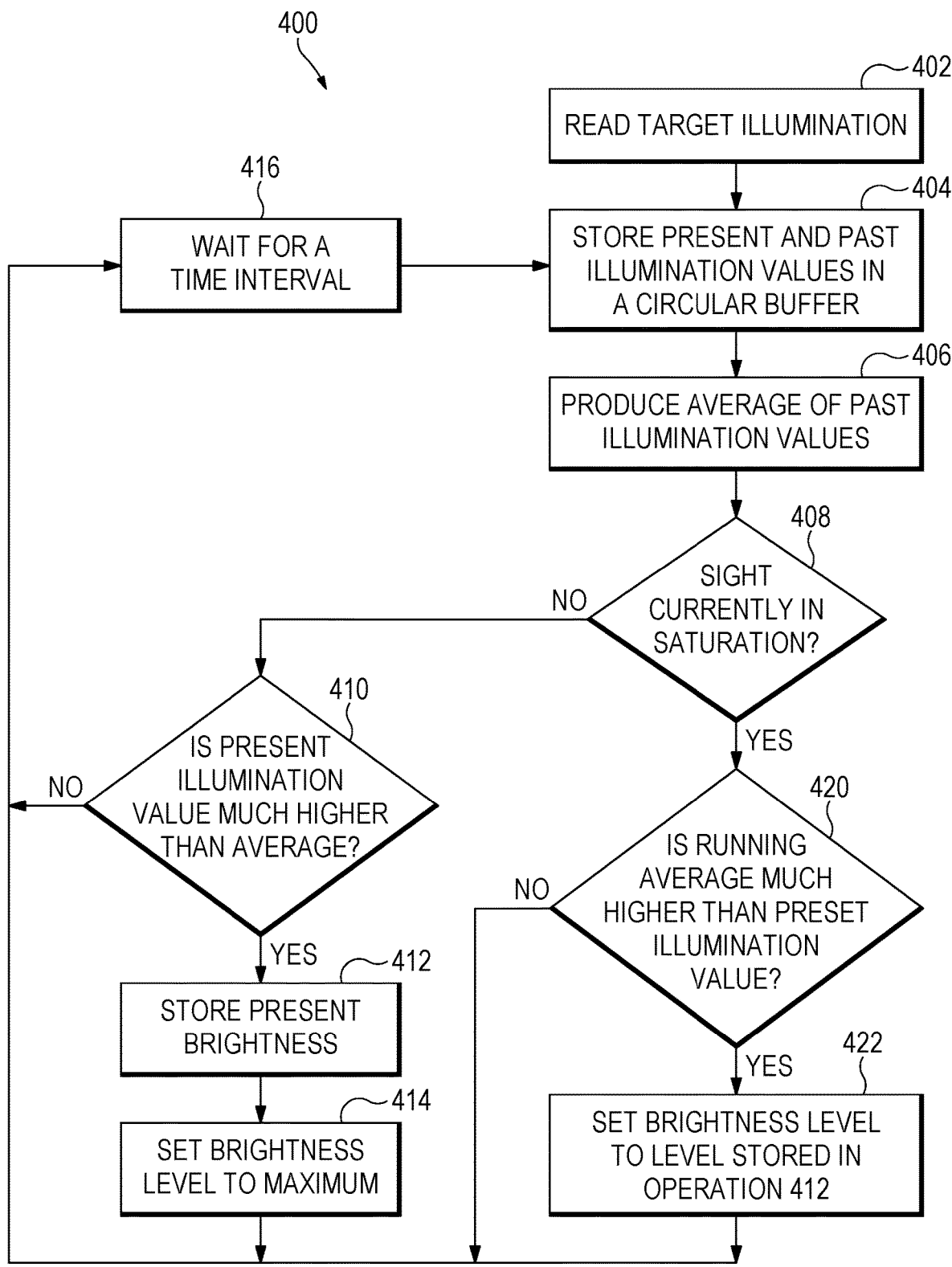
FIG. 6 is a flowchart illustrating example operations of a brightness control of the target dot sight of FIG. 1, according to embodiments.

FIG. 6 is a flowchart illustrating example operations of a brightness control flow 400 of the target dot sight of FIG. 1, according to embodiments. In general, after an initialization, the sight senses an amount of illumination from the target through a target illumination sensor, such as the sensor 210 of FIG. 4, in an operation 402. These sensed values are periodically stored in a series of the sensed values in an operation 408, such as in a circular buffer, although other memory schema may be used. In some embodiments the stored illumination values are averaged in an operation 406 in a continually adjusting manner, as the target illumination changes. In some embodiments the average is determined by only those values stored in the circular buffer. In other embodiments the average may include historical values that have already been overwritten in the circular buffer, i.e., values that are older than the number of storage locations in the circular buffer.

Then, in an operation 408, the flow 400 checks to see if the brightness control is currently in a light saturation mode or not. Light saturation mode means that the target is much more brightly illuminated than it previously was, whereas not being in saturation mode means that the target is not much more brightly illuminated than it previously was. In some embodiments, the level of brightness difference between saturation mode and non-saturation mode is user adjustable. The sight may change from non-saturation mode to saturation mode when another light source is suddenly directed to the target, such as from a flashlight, or other light source, for example. Note that the operation 408 determines whether the brightness controller is presently in the saturation mode. Causing the brightness controller to enter or leave the saturation mode is controlled by operations 414 and 422 described below.

If the sight is not already in saturation mode, the flow 400 leaves the comparison 408 in the NO direction. Next, the process 400 compares an instantaneous reading from the illumination sensor to the present average of the stored values in a comparison operation 410. If the instantaneous light reading is much greater than the running average, determined in the comparison 410, then the flow 400 exits the comparison 410 in the YES direction. In some embodiments, the definition of "much greater than the running average" means exceeding the running average by 25 Lux, but different embodiments can use different threshold levels depending on the implementation.

After exiting operation 410 in the YES direction, the flow 400 stores the present brightness, which may have been a user-selected brightness level, in an operation 412 and sets the brightness value of the device to maximum brightness in an operation 414. The flow 400 sets the brightness value to maximum brightness because the target was suddenly illuminated very brightly, i.e., the present brightness value greatly exceeds the average brightness value, and the sight is responsive to bring up the brightness value of the target dot quickly. The flow 400 also changes its mode to "currently in light saturation mode" so that the operation 408 will be answered correctly the next time the process loops through the flow 400. Then the flow 400 progresses to a wait state 416, and waits until the next sampling interval occurs before repeating the process. In some embodiments the sampling interval is 100 ms. In other embodiments the sampling interval may be set to an interval between 10 ms and 500 ms. In some embodiments the interval is user controllable.

Returning back to operation 408, if the sight is not presently in light saturation mode and the outcome of the comparison in operation 410 is NO, then this means the instantaneous sensor reading is higher than the average reading, but does not exceed the average by the threshold amount, such as 25 Lux. In this case, the flow 400 exits operation 410 in the NO direction to the wait state 416 before repeating the analysis again. This process provides a hysteresis effect to the operation of the flow 400.

Returning back to operation 408 once more, if the sight 200 is presently in light saturation mode, the flow 400 exits comparison 408 in the YES direction to another comparison 420. Comparison 420 determines whether the running average of the light readings is much greater than the instantaneous light reading. In some embodiments, the definition of "much greater than the instantaneous light reading" means exceeding the instantaneous light reading by 25 Lux, but different embodiments can use different threshold levels depending on the implementation. If the running average is much greater than the instantaneous light reading, then the flow 400 exits operation 420 in the YES direction, which indicates that the illumination of the target has suddenly dropped from its previous illumination. In this case, the brightness level is set in an operation 422 to the level previously stored in the operation 412, meaning that the brightness level of the target light returns to the level previously set by the user, and is no longer in the maximum brightness mode (unless the user had previously set the brightness level to its maximum). The operation 422 also resets the saturation mode of the brightness controller to not being in saturation mode.

Although particular values, such as 25 Lux and 100 ms are used in the example flow 400 above, embodiments of the invention may work with values different from those given here, and instead may be varied depending on implementation details.

Figure 7:
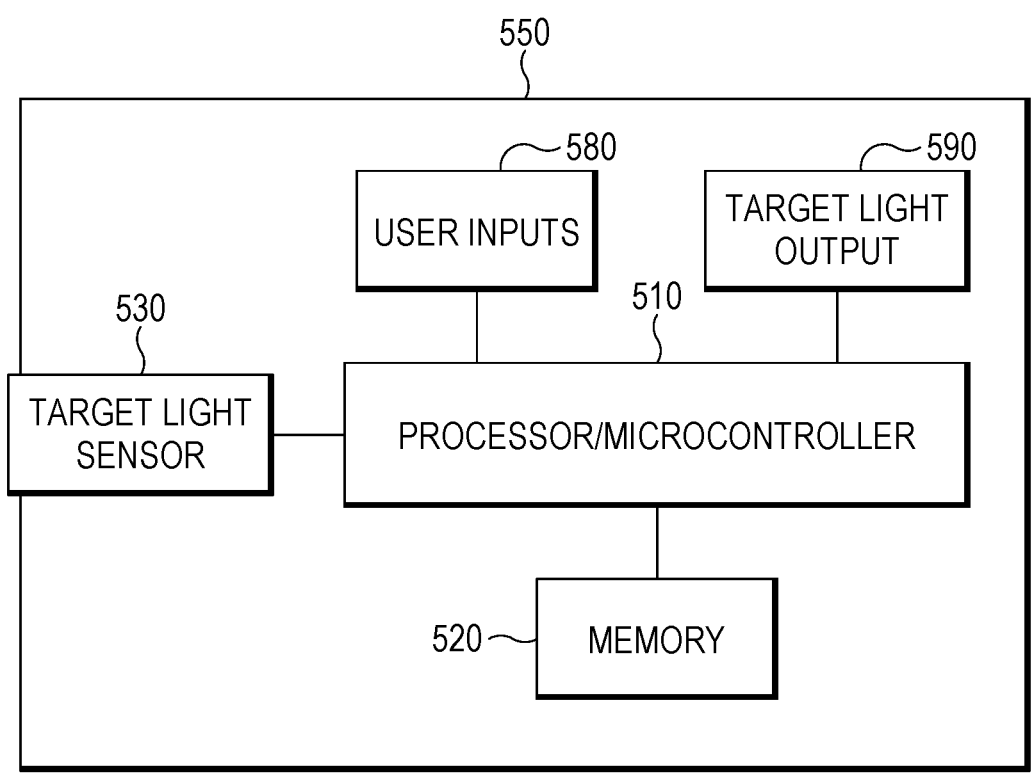
FIG. 7 is a block diagram illustrating example components of a brightness control system according to embodiments of the invention.

FIG. 7 is a block diagram of an example processor system 550, which may perform the main operations described in the flow 400 of FIG. 6, and may also control operation of the target light output. In some embodiments the example processor system 550 may be used as the brightness control system 150 described above.

The processor system 550 includes a central processor or microcontroller 510 configured or programmed to perform the brightness control operations described above. Although only one processor 510 is shown in FIG. 1 for ease of illustration, as will be understood by one skilled in the art, any number of processors or microcontrollers 510 of varying types may be used in combination, rather than a single processor.

The processor or microcontroller 510 may be configured to execute instructions from a memory 520 and may perform any methods and/or associated steps indicated by such instructions, such as reading brightness values, averaging values, storing present brightness values, etc. The memory 520 may be implemented as processor cache, random access memory (RAM), read only memory (ROM), solid state memory, non-volatile memory, hard disk drive(s), or any other memory type. In some embodiments the memory 520 is integrated with the processor or microcontroller 510. The memory 520 acts as a medium for storing data, computer program products, and other instructions.

User inputs 580 are coupled to the one or more processors 510. User inputs 580 may include one or more pushbuttons, a selectable menu, touchscreen, and/or any other controls employable by a user to interact with the sight. In some embodiment the user inputs 580 may be made on another device, such as a mobile phone or computer and sent through a communication channel, wired or wireless, to the processor system 550.

A target light sensor 530 may operate as any of the target light sensors described above. In general, the target light sensor 530 creates an output signal reading indicative of the amount of light striking the target light sensor. As described above, the target light sensor is positioned to minimize reading of ambient light while maximizing the reading the light striking a target. The target light sensor 530 output is fed to the processor or microcontroller 510. After the processor or microcontroller 510 determines at which output to drive the target light, a signal is fed to a target light output 590 to generate the target dot or target light at the brightness level controlled by the processor or microcontroller 510.

The aspects of the present disclosure are susceptible to various modifications and alternative forms. Specific aspects have been shown by way of example in the drawings and are described in detail herein. However, one should note that the examples disclosed herein are presented for the purposes of clarity of discussion and are not intended to limit the scope of the general concepts disclosed to the specific aspects described herein unless expressly limited. As such, the present disclosure is intended to cover all modifications, equivalents, and alternatives of the described aspects in light of the attached drawings and claims.

References in the specification to aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

EXAMPLES

Illustrative examples of the technologies disclosed herein are provided below. An example of the technologies may include any one or more, and any combination of, the examples described below.

Example 1 is a targeting sight, comprising a light generating source structured to generate a target light and project it toward a target, a target light sensor disposed in the targeting sight and structured to sense a brightness value of the target while excluding ambient light from the target light sensing, and a brightness controller structured to control the light generating source based at least in part on the brightness value sensed by the target light sensor.

Example 2 is a targeting sight according to Example 1 above, in which the targeting sight comprises an aperture, and in which the target light sensor is disposed in the aperture.

Example 3 is a targeting sight according to Examples 1 and 2 above, in which the aperture is structured to block at least a portion of ambient light from reaching the target light sensor.

Example 4 is a targeting sight according to Examples 1 and 2 above, further comprising a light pipe disposed in the aperture.

Example 5 is a targeting sight according to Examples 1 and 2 above, further comprising a fiber optic disposed in the aperture.

Example 6 is a targeting sight according to any of the Examples above, in which the brightness controller stores historic target brightness levels.

Example 7 is a targeting sight according to Example 6, in which the brightness controller determines an average of historic target brightness values.

Example 8 is a targeting sight according to Example 7, in which the brightness controller compares a present target light value to the average of historic target brightness values.

Example 9 is a method for controlling a target light generator in a targeting sight, comprising reading a present brightness of a target, generating an average brightness value from two or more target brightness readings, comparing the present brightness of the target to the average brightness value, and generating a target light generator control signal based on the comparison of the present brightness of the target to the average brightness value.

Example 10 is a method according to Example 9 above, further comprising determining whether the target light generator is in a saturation mode.

Example 11 is a method according to Examples 9-10 above, further comprising setting the target light generator to the saturation mode when the present brightness of the target exceeds the average brightness value by 25 Lux or more.

Example 12 is a method according to Examples 9-11 above, further comprising storing a present level of the target light generator control signal level prior to setting the target light generator to the saturation mode.

Example 13 is a method according to Examples 9-12 above, further comprising entering a restoration setting mode when the target light generator is in the saturation mode, but when the present brightness of the target is below the average brightness value by 25 Lux or more.

Example 14 is a method according to Examples 9-13 above, further comprising, when entering the restoration setting mode, setting the target light generator control signal to a previously stored light generator control signal level.

Additionally, this written description refers to particular features. One should understand that the disclosure in this specification includes all possible combinations of those particular features. For example, where a particular feature is disclosed in the context of a particular aspect, that feature can also be used, to the extent possible, in the context of other aspects.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

In addition, when this application refers to a method having two or more defined steps or operations, the defined steps or operations can be carried out in any order or simultaneously, unless the context excludes those possibilities.

Although specific embodiments have been illustrated and described for purposes of illustration, it will be understood that various modifications may be made without departing from the spirit and scope of the disclosure.

What is claimed is:

1. A targeting sight, comprising:
    a light generating source structured to generate a target light and project it toward a target;
    a target light sensor disposed in the targeting sight and structured to sense a target brightness value of the target while excluding ambient light from the target light sensing;
    an ambient light sensor separate from the target light sensor and structured to sense an ambient brightness value of ambient light; and
    a brightness controller structured to control the light generating source based at least in part on the target brightness value sensed by the target light sensor.

2. The targeting sight according to claim 1, in which the targeting sight comprises an aperture, and in which the target light sensor is disposed in the aperture.

3. The targeting sight according to claim 2, in which the aperture is structured to block at least a portion of ambient light from reaching the target light sensor.

4. The targeting sight according to claim 1, in which the brightness controller is further structured to control the light generating source based at least in part on the ambient brightness value.

5. The targeting sight according to claim 1, in which the brightness controller is structured to store a historic value of a light driving level of the light generating source.

6. The targeting sight according to claim 1, in which the brightness controller is structured to store past target brightness values.

7. The targeting sight according to claim 6, in which the brightness controller is structured to store past target brightness values in a local memory.

8. The targeting sight according to claim 6, in which the brightness controller is structured to compare a present target brightness values to at least one of the past target brightness values.

9. The targeting sight according to claim 8, in which the brightness controller is structured to change a present level of driving the target light to a new level of driving the target light based on a comparison of the present target brightness value to the at least one of the past target brightness values.

10. The targeting sight according to claim 6, in which the brightness controller is structured to compare a present target brightness values to an average of stored past target brightness values.

11. The targeting sight according to claim 10, in which the brightness controller is structured to change a present level of driving the target light to a new level of driving the target light based on a comparison of the present target brightness value to the average of stored past target brightness values.

12. A method for controlling a target light generator in a targeting sight, the method comprising:
    reading a present brightness of a target through a target light sensor;
    reading an ambient light value through an ambient light sensor different than the target light sensor;
    generating an average brightness value from two or more target brightness readings;
    comparing the present brightness of the target to the average brightness value;
    generating a target light generator control signal based on the comparison of the present brightness of the target to the average brightness value.

13. The method according to claim 12, in which generating a target light generator control signal is further based in part on the ambient light value.

14. The method according to claim 12, further comprising determining whether the target light generator is in a saturation driving mode.

15. The method according to claim 14, further comprising setting the target light generator to a saturation driving mode when the present brightness of the target exceeds the average brightness value by 25 Lux or more.

16. The method according to claim 14, further comprising entering a restoration setting mode when the target light generator is in the saturation driving mode, but when the present brightness of the target is below the average brightness value by 25 Lux or more.

17. The method according to claim 16, further comprising, when entering the restoration setting mode, setting the target light generator control signal to a previously stored light generator control signal level.

18. The method according to claim 12, further comprising storing a present driving level of the target light generator control signal level prior to setting the target light generator to the saturation mode.

* * * * *